Patented Apr. 25, 1950

2,505,470

UNITED STATES PATENT OFFICE 2,505,470

PRESSURE SENSITIVE RECORD MATERIAL

Barrett K. Green, Dayton, Ohio, assignor to The National Cash Register Company, Dayton, Ohio, a corporation of Maryland No Drawing. Application November 8, 1947, Serial No. 784,938

28 Claims. (Cl. 117—36)

This invention relates to improvements in pressure-sensitive record material. This application is a continuation in part of the pending applications of Barrett K. Green, Serial No. 520,573, filed January 31, 1944, for Record material and coating for same, now abandoned; Serial No. 581,834, filed March 9, 1945, for Coating for record material, now abandoned; and Serial No. 601,761, filed June 27, 1945, for Method of making pressure-sensitive marking coatings for record material, now abandoned, as a division of said co-pending application Serial No. 581,834.

The principal object of this invention is to provide a pressure-sensitive record material on which a mark of distinctive color may be produced by the mere application of localized pressure and which is not subject to the disadvantages inherent in the pressure-sensitive record material disclosed in United States Letters Patent No. 2,299,693, patented October 20, 1942, on the application filed by Barrett K. Green on February 23, 1940. That patent discloses a pressure-sensitive record material including the combination of an insulating medium, a rupturable solid material such as gum dammar, having included therein interspersed droplets of a plurality of liquid reagents, which are chemically reactive to produce a distinctive color in the record material at the points of application of localized pressure thereto, such pressure rupturing the insulating medium to permit chemical reaction between the two liquid reagents. The two reagents disclosed in this patent are gallic acid and ferric ammonium sulphate, each dissolved in glycerine. These reagents are ionized by the glycerine, which constitutes an ionizing medium, and the chemical reaction proceeds by interchange of ions when the two solutions are allowed to mix, upon the rupture of the insulating medium. The reaction disclosed in that patent depends upon the presence of the reagents in an ionizing medium. However, any available ionizing medium is hygroscopic, with the result that the record material made in accordance with this patent is sensitive to an excess of moisture, and conditions of high humidity may cause the insulating medium to cease to be effective, with the result that the chemical reaction takes place without any application of localized pressure, and the record material is stained and discolored, so that it ceases to be useful.

As stated above, the principal object of the present invention is to provide a pressure-sensitive record material that is not subject to the defects and disadvantages of that disclosed in Patent No. 2,299,693, as indicated above.

Another object of the present invention is to provide a record material upon which a mark of distinctive color may be produced, at the points of application of localized pressure thereto, by such mere application of localized pressure, and which will not become discolored or stained due to the effect of light, atmospheric conditions, or aging.

In short, it is the object of this invention to provide a pressure-sensitive record material in which the mark of distinctive color will be produced only at the points of application of localized pressure, and at no other points, and under no other conditions.

Another object of this invention is to provide a pressure-sensitive record material in which the mark of distinctive color is produced by the chemical reaction of color-forming reactants, in the absence of any liquid ionizing medium therefor.

A further object of this invention is to provide a pressure-sensitive record material in which a mark of distinctive color is produced by a reaction between solid particles of color-forming reactants.

Further objects, and objects relating to details and economies of production, will definitely appear from the detailed description to follow. The objects of this invention have been attained by the several embodiments thereof described in detail in the following specification. This invention is clearly defined and pointed out in the appended claims.

In general, the present invention contemplates a pressure-sensitive record material comprising, in combination, a plurality of adsorption color-forming reactants, such reactants being so selected that they react, in the absence of a liquid ionizing medium for the reactants, to form a distinctive color when brought into adsorption contact with each other, and a solid insulating medium insulating said reactants from color-forming reaction contact with each other. Upon application of localized pressure to the record material, as by drawing a stylus across it, the insulating medium is ruptured at the points of application of said localized pressure, and such rupture permits color-forming reaction contact between the reactants at such points, in the absence of any liquid ionizing medium for said reactants. The result is that a mark of distinctive color is produced by the mere application of localized pressure.

In the preferred form of this invention, both of the color-forming reactants, as well as the insulating medium, are in the solid state, and the color-forming reaction takes place upon mere contact of solid particles of the reactants. A pressure-sensitive record material may be provided in which the solid particles of a plurality of color-forming reactants are interspersed in a solid insulating medium, which insulates the particles from color-forming reaction contact with each other. The rupture of this solid insulating medium by the application of localized pressure permits the solid particles of color-forming reactants to react with each other, at the points of application of such pressure, to produce the mark of distinctive color. According to one form of this invention, solid particles of one of the color-forming reactants are carried by and dispersed in a solid insulating medium, to which a coating of solid particles of another color-forming reactant is applied. In this case, the application of localized pressure ruptures the solid insulating medium at the points of application of such pressure and brings about color-forming reaction contact between the solid particles of color-forming reactants at such points, thus producing the mark of distinctive color. Preferably, this pressure-sensitive record material includes a supporting member, such as a fibrous web of paper or the like, to which the coating of solid insulating medium and the color-forming reactants is applied.

Since it is difficult to show precisely the spatial relationship between the solid particles of color-forming reactants, the solid insulating medium, and the base web, it is preferred not to attempt to illustrate any embodiment of this invention by drawings.

The color forming reaction employed is of the, so-called, adsorption type in which an inorganic material causes a color change in an organic material when in adsorption contact with it.

Of the reactant materials employed the organic material is an electron donor aromatic compound having a double bond system which is convertible to a more highly polarized conjugated form upon taking part in an electron acceptor-donor solid surface chemical reaction, giving it a distinctive color, and the inorganic material is a material which acts as an acid relative to the organic material so as to be an electron acceptor when in adsorption contact therewith. Both materials are in fine particle form in order to furnish a large reactant surface area per unit area of the record material which enhances the depth of color per unit area of the record material.

In the following examples, there will be described embodiments of this invention, by means of which the objects of the invention have been successfully attained.

The following embodiment of this invention constitutes the best mode of applying the principle thereof contemplated up to the present time and may be considered the preferred embodiment. It comprises a base web of paper or the like, to which is applied a coating including casein and solid particles of three color-forming reactants; namely, kaolin, the compound 3,3 bis (p-dimethylaminophenyl)-6 dimethylamino phthalide, referred to as "crystal violet lactone" and having the structure

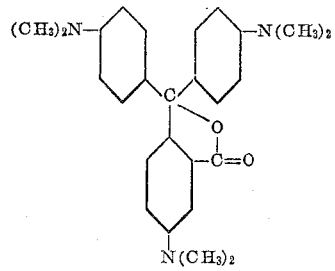

and the compound tetramethylbenzidine, having the structure

The casein constitutes the solid insulating medium, insulating one of the color-forming reactants—that is, kaolin—from color-forming reaction contact with the other color-forming reactants—that is, crystal violet lactone and tetramethylbenzidine. This record material is normally white or bluish white in color, and, upon the application of localized pressure thereto, as by drawing a stylus thereover, a dark blue mark is produced at the points of application of such localized pressure. Such application of pressure ruptures the solid insulating medium at the points of application of pressure, permitting color-forming reaction contact between the solid particles of kaolin and the solid particles of crystal violet lactone and tetramethylbenzidine, thus causing the color change at such points that produces the mark.

The compound 3,3 bis (p-dimethylaminophenyl) - 6 dimethylamino phthalide—that is, "crystal violet lactone"—and the process of making it are disclosed in United States Letters Patent No. 2,417,897, issued March 25, 1947, on the application of Clyde S. Adams, filed June 16, 1945, although the compound is incorrectly named in said patent as "3,3 bis (4-dimethylaminophenyl) - 6 dimethylaminophenyl phthalide."

It is not considered that the proportions in which these several ingredients are present in the record material are of particular importance, but good results have been obtained with a pressure-sensitive record material having such ingredients present in the following proportions by weight in the coating on the base web:

| | Per cent |
|---|---|
| Casein | 8.85 |
| Kaolin | 88.50 |
| Crystal violet lactone | 2.25 |
| Tetramethylbenzidine | .40 |

When these ingredients are applied to the paper as a coating thereon, such coating weighs about .0023 pound per square foot of surface and may have a thickness of the order of from .0005 to .001 inch. The thickness of the coating varies, of course, with the treatment to which the record material is subjected in finishing. The solid particles of kaolin in this record material may be of about the order of ten microns in diameter, although considerable variation in particle size is possible without any ill effects. Particle size of the crystal violet lactone and the tetramethylbenzidine is largely determined by the method of application of those ingredients. The particles of these reactants may be as large as ten microns in diameter and frequently are much smaller.

Organic film-forming hydrophilic colloid substances such as gelatine, methyl cellulose, starch, polyvinyl alcohol, and animal glue are representative materials that may be substituted for casein as the solid insulating medium. Any of the following inorganic materials may be substituted for kaolin as one of the color-forming reactants: attapulgite (Attapulgus clay), pyrophyllite, talc, bentonite, halloysite, calcium sulphate, calcium citrate, magnesium trisilicate, zinc sulphide, zirconium dioxide, calcium phosphate, barium sulphate, and calcium fluoride. When any of these materials are substituted for the kaolin in this combination, the resulting record material will be white or bluish white in color, and a dark blue mark will appear thereon as the result of the application of localized pressure.

If the tetramethylbenzidine be omitted and the pressure-sensitive record material be made using kaolin and crystal violet lactone as the sole color-forming reactants, the record material will be white in color, and application of localized pressure will produce a dark blue mark thereon, but this mark may fade upon continued exposure to light under conditions of high humidity. On the other hand, if the crystal violet lactone be omitted and tetramethylbenzidine and kaolin be used as the sole color-forming reactants, the pressure-sensitive record material produced will be normally white, and application of localized pressure thereto will produce a green mark, which deepens in color upon aging and does not fade as readily, under conditions of high humidity, as the mark produced by crystal violet lactone and kaolin alone.

This pressure-sensitive record material is not substantially affected by the amount of atmospheric humidity ordinarily encountered, although the mark may fade somewhat if subjected to high humidity for a long-continued period of time. However, this pressure-sensitive record material does not become stained or discolored by exposure to high humidity for long periods of time and retains its ability to respond to the application of localized pressure and to produce the mark of distinctive color under such conditions. This is thought to be due to the fact that the record material does not include any hygroscopic ionizing media. Consequently, the structure of the record material is not altered or modified due to the absorption of water from the atmosphere.

One method that has been used successfully to make the pressure-sensitive record material described above is as follows: A slurry of kaolin and water was prepared including fifty parts by weight of kaolin to fifty parts by weight of water, and a small amount of a suitable dispersing agent, such as sodium metaphosphate, for instance, in the proportion of 0.075% by weight was added to facilitate the dispersion of the particles of kaolin throughout the slurry. The addition of this dispersing agent reduces the viscosity of the slurry considerably, thus facilitating its mixing and application and also preventing the settling of the solid particles of kaolin. A 20% by weight solution of casein in water was formed by, first, dispersing the casein in cold water by stirring for fifteen minutes at room temperature and, then, heating up to 60 degrees centigrade. Five parts by weight of a 28% ammonium hydroxide solution—that is, one having a specific gravity of 25.9° Bé., at $$\frac{20°}{4} C.$$

were then added to the hot casein solution, which was stirred for about fifteen minutes and allowed to cool to room temperature. The kaolin slurry and the alkaline casein solution were then thoroughly mixed and blended in the ratio of ten parts by weight of kaolin to one part of casein, and, at this stage, a small percentage—for instance, about 0.05% by weight—of tributyl phosphate in alcohol, or other anti-foaming agent, was added. This mixture of the kaolin slurry and the casein solution was then applied as a coating to the paper, and the coated paper was dried and calendered or treated in any desired way to give the proper surface finish. A solution in toluene of about 2.55% by weight of crystal violet lactone and about .45% by weight of tetramethylbenzidine was then applied to the coated side of the paper, the excess of this solution was removed in any suitable way, as by passing under a doctor blade, and then the treated paper was dried to evaporate the toluene and was ready for use.

A successful pressure-sensitive record material such as that described above, using casein as the solid insulating medium and kaolin, crystal violet lactone, and tetramethylbenzidine as the color-forming reactants, was made by the following process: 200 grams of kaolin were made into a slurry with 200 grams of water, to which 0.3% by weight of sodium metaphosphate was added as a dispersing agent. A casein solution was formed by dispersing 20 grams of casein in 139 grams of cold water and stirring for fifteen minutes. This dispersion of casein in water was then heated to 60 degrees centigrade, and 5 grams of commercial 28% ammonium hydroxide solution were added, and the solution was stirred for fifteen minutes while hot, after which it was allowed to cool to room temperature. One-half of the casein solution thus formed was thoroughly mixed with the kaolin slurry. 5.1 grams of crystal violet lactone and .9 gram of tetramethylbenzidine were then dissolved in 50 cc. of 3.7% hydrochloric acid solution having a specific gravity of 2.5° Bé. at $$\frac{20°}{4} C.$$

To the other half of the casein solution, 5 grams of commercial 28% ammonium hydroxide solution were added, and the acidified solution of crystal violet lactone and tetramethylbenzidine was added slowly to this portion of the casein solution, with continued stirring, for about an hour. The portion of the casein solution containing the kaolin was passed through a homogenizer or other means for mixing and thoroughly dispersing the particles of kaolin in the casein solution, and the two portions of casein solution, one containing the kaolin and the other containing the crystal violet lactone and the tetramethylbenzidine, were then mixed thoroughly and applied as a coating to the base web of paper. This coating was then dried on the paper in the usual manner. The resulting record material had a light bluish white color approaching white.

It should be noted that the mixing of the ammoniacal kaolin-containing portion of the casein solution with the other portion of the casein solution, containing the crystal violet lactone and the tetramethylbenzidine, results in an alkaline mixture, in which the crystal violet lactone and the tetramethylbenzidine are precipitated in extremely fine particles.

In case gelatin is substituted for casein as the solid insulating medium, the procedure described above is modified, in that the gelatin is first dissolved in water at a temperature above 40 degrees centigrade, and this gelatin solution is then divided into two equal parts, to one of which the slurry of kaolin and water is added as before. The other part of the gelatin solution is made sufficiently ammoniacal to neutralize and precipitate the crystal violet lactone and the tetramethylbenzidine when the hydrochloric acid solution of these ingredients is added thereto. These two portions of the gelatin solution are then mixed, and the mixture is applied as a coating to the paper and then dried. It should be noted that, when gelatin is used as the solid insulating medium, the gelatin solution should be kept at a temperature above 40 degrees centigrade throughout the entire procedure.

In case methyl cellulose is used as the solid insulating medium in substitution for the casein, a solution is prepared by dissolving about 5 parts by weight of methyl cellulose (of any viscosity between 2000 and 4000 centipoises at 68 degrees Fahrenheit) in about 50 parts by weight of water, and this solution is divided into two equal parts. To one portion of the methyl cellulose solution, the slurry of kaolin and water is added, in the ratio of 40 parts by weight of kaolin to one part by weight of methyl cellulose, and mixed, as described in connection with the use of casein. The other portion of the methyl cellulose solution is rendered sufficiently ammoniacal to precipitate the crystal violet lactone and the tetramethylbenzidine from the hydrochloric acid solution thereof, when the latter is added to and mixed with this portion of the methyl cellulose solution in such proportions that the ratio by weight of kaolin to crystal violet lactone and tetramethylbenzidine in the coating will be 100 to 3. The two portions of the methyl cellulose solution are then thoroughly mixed and applied as a coating to the paper, which coating is dried.

Another embodiment of this invention comprises a base web of paper or the like having applied thereto a coating including casein or methyl cellulose as the solid insulating medium and solid particles of two color-forming reactants; namely, kaolin and the compound 3,3 bis (p-dimethylaminophenyl) phthalide, also known as "malachite green lactone," having the structure

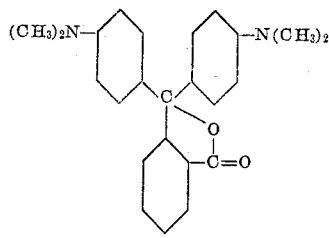

This record material is normally white or light in color, and, upon application of localized pressure thereto, as by drawing a stylus thereover, a mark of dark blue-green color is produced at the points of application of such pressure.

Record material made with "malachite green lactone" is claimed in a divisional application, Serial No. 59,422, filed November 10, 1948.

Another embodiment of this invention comprises a base web of paper having applied thereto a coating including casein as the solid insulating medium and two color-forming reactants; namely, kaolin and the compound 2,4 bis[p-(p-dimethylaminophenylazo) anilino]6-hydroxy sym. triazine, having the structure

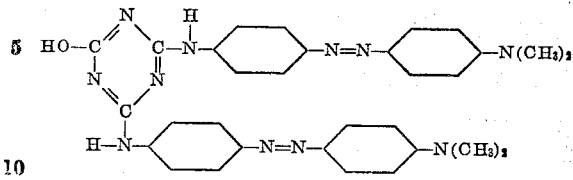

The pressure-sensitive record material made using these ingredients is normally yellow in color, and the application of localized pressure thereto, as by drawing a stylus across the material, ruptures the solid insulating medium and permits the solid particles of kaolin and the organic color-forming reactant to come into color-forming reaction contact with each other, producing a dark blue mark at the points of application of such localized pressure.

Record material made with the above identified triazine compound is claimed in a divisional application, Serial No. 59,423, filed November 10, 1948.

Another embodiment of this invention consists of a pressure-sensitive record material including a base web of paper having applied thereto a coating including casein as the solid insulating medium and two color-forming reactants; namely, kaolin and the compound o-hydroxybenzalacetophenone, having the structure.

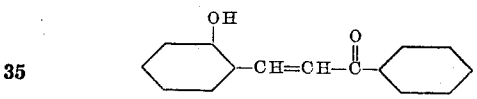

This record material comprises solid particles of kaolin and o-hydroxybenzalacetophenone insulated from color-forming reaction contact with each other by casein as the solid insulating medium. The record material is normally light yellow in color, and application of localized pressure thereto ruptures the insulating medium at the points of application of such pressure, permitting color-forming reaction contact between the particles at such points and producing a reddish-yellow mark.

Record material made with o-hydroxy-benzalacetophenone is claimed in a divisional application, Serial No. 59,424, filed November 10, 1948.

Another pressure-sensitive record material constituting an embodiment of this invention that has been successfully made consists of a web of paper having applied thereto a coating comprising casein as the solid insulating medium and two color-forming reactants; namely, kaolin and the compound bis (p-dimethylaminophenyl) methanol, also known as "Michler's hydrol" and having the structure

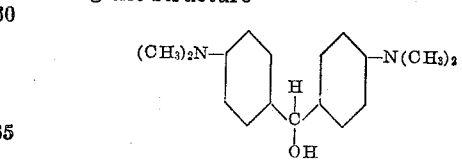

Record material made with "Michler's hydrol" is normally white or light gray but produces a dark blue mark at points of marking pressure.

Another embodiment of this invention consists of a web of paper having applied thereto a coating comprising casein as the solid insulating medium and two color-forming reactants; namely, kaolin and the compound bis (p-dimethylaminophenyl) - methoxy - methane, also known as "methyl ether of Michler's hydrol," having the structural formula

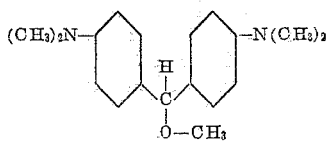

Record material made with the methyl ether of "Michler's hydrol" is normally white or grayish and produces a dark blue mark at points of marking pressure.

Record material made with "Michler's hydrol" or the methyl ether of "Michler's hydrol" is claimed in a divisional application, Serial No. 59,425, filed November 10, 1948.

Another record material constituting an embodiment of this invention consists of a web of paper having applied thereto a coating comprising casein as the solid insulating medium and two color-forming reactants; namely, kaolin and the compound 3,3 bis (p-diethylaminophenyl) phthalide, having the structural formula

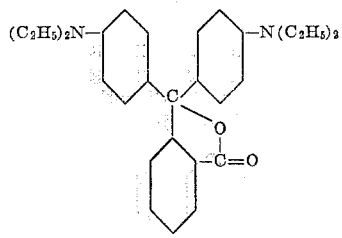

Record material made with 3,3 bis (p-diethylaminophenyl) phthalide is normally white and produces a blue-green mark at points of marking pressure. It is claimed with record material made with 3,3 bis (p-di-n propylaminophenyl) phthalide in a divisional application, Serial No. 59,426, filed November 10, 1948.

Another embodiment of this invention consists of the pressure-sensitive record material comprising a web of paper having applied thereto a coating including casein as the solid insulating medium and solid particles of two color-forming reactants; namely, kaolin and the compound 3,3 bis (p-methylaminophenyl) phthalide, having the structural formula

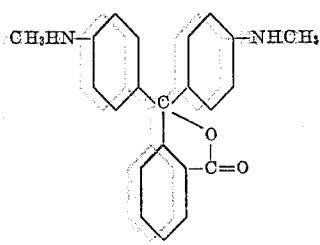

This record material is normally white, but the application of localized pressure thereto ruptures the insulating medium, casein, at the points of application of such pressure, permitting color-forming reaction contact between the solid particles of kaolin and the solid particles of the compound 3,3 bis (p-methylaminophenyl) phthalide, resulting in the production of a bright blue mark.

Record material made with 3,3 bis (p-methylaminophenyl) phthalide is claimed with record material made with 3,3 bis (p-ethylaminophenyl) phthalide in divisional application, Serial No. 59,427, filed November 10, 1948.

Another embodiment of this invention is a pressure-sensitive record material consisting of a web of paper having applied thereto a coating consisting of casein as the solid insulating medium and solid particles of two color-forming reactants; namely, kaolin and the compound 3,3 bis (p-ethylaminophenyl) phthalide, having the structural formula

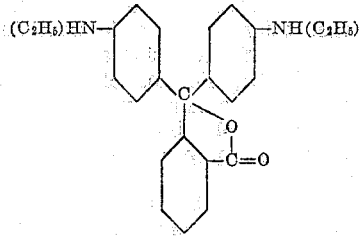

This record material is normally white, but the application of localized pressure thereto ruptures the solid insulating medium at the points of application of such pressure, thus permitting color-forming reaction contact between the solid particles of kaolin and 3,3 bis (p-ethylaminophenyl) phthalide, resulting in a bright blue mark.

Another embodiment of this invention is a pressure-sensitive record material consisting of a web of paper having applied thereto a coating including casein as the solid insulating medium and solid particles of two color-forming reactants; namely, kaolin and the compound 2(4,4' bis dimethylaminobenzohydryl) 5 dimethylaminobenzoic acid, having the structural formula:

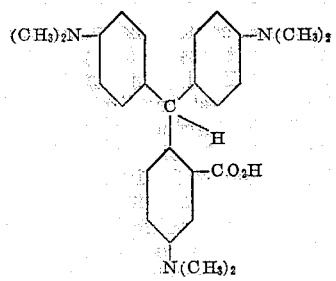

The record material is normally white, and the application of localized pressure thereto ruptures the solid insulating medium at the points of application of such pressure, permitting color-forming reaction contact between the solid particles of the reactants, producing a dark blue mark.

Record material made with 2(4,4' bis dimethylaminobenzohydryl) 5 dimethylaminobenzoic acid is claimed in a divisional application, Serial No. 59,428, filed November 10, 1948.

Another pressure-sensitive record material constituting an embodiment of this invention consists of a web of paper having applied thereto a coating including casein as the solid insulating medium and solid particles of two color-forming reactants; namely, kaolin and the compound 3,3 bis (p-di n-propylaminophenyl) phthalide, having the structural formula:

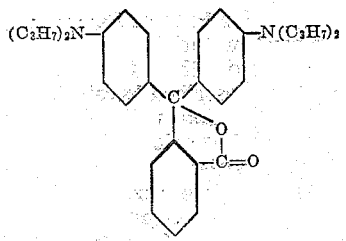

This record material is normally white, and the solid insulating medium, casein, insulates the solid particles of kaolin from color-forming reaction contact with the solid particles of the compound 3,3 bis (pi-di n-propylaminophenyl) phthalide, but the application of localized pressure to this record material ruptures the insulating medium and permits color-forming reaction contact between the solid particles of the two reactants, thus producing a blue-green mark at the points of application of such pressure.

Another pressure-sensitive record material constituting an embodiment of this invention consists of a web of paper having applied thereto a coating including casein as the solid insulating medium and solid particles of two color-forming reactants, kaolin and the compound 3,3 bis (4-dimethylamino 3-methyl phenyl) phthalide, having the structural formula:

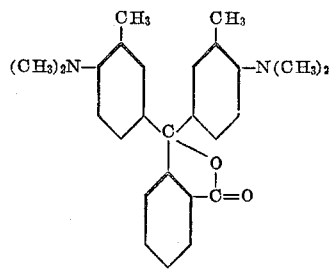

This record material is normally white, but a blue mark is produced thereon by the application of localized pressure, which ruptures the insulating medium, casein, and permits color-forming reaction contact between the solid particles of the reactants at the points of application of such localized pressure.

Record material made with 3,3, bis (4-dimethylamino 3-methylaminophenyl) phthalide is claimed in a divisional application, Serial No. 59,429, filed November 10, 1948.

Another pressure-sensitive record material constituting an embodiment of this invention consists of a web of paper having applied thereto a coating including casein as the solid insulating medium and solid particles of two color-forming reactants; namely, kaolin and the compound 4′ (p-dimethylaminophenylazo) benzanilide, having the structural formula:

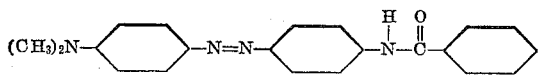

This record material is normally light yellow in color, but the application of localized pressure thereto produces a dark brown mark thereon at the points of application of such pressure.

Record material made with the benzanilide compound is claimed in a divisional application, Serial No. 59,430, filed November 10, 1948.

The methods and processes of making pressure-sensitive record material disclosed herein are not claimed in this application but are disclosed and claimed in the pending application of Barrett K. Green, Serial No. 784,939, filed November 8, 1947, for Process for making pressure-sensitive record material.

It is understood that the pressure-sensitive record material described herein is susceptible of considerable variation without departing from the spirit of the invention.

What is claimed is:

1. Pressure-sensitive record material including the combination of a supporting member; solid particles of a plurality of adsorbent color-forming reactants deposited in contiguity to each other on said member; and a solid insulating medium including an organic hydrophilic film-forming material inert as to and insulating said solid reactant particles from color-forming reaction contact with each other, a first one of said reactants being solid particles of an electron donor aromatic organic compound having a double bond system which is convertible to a more highly polarized conjugated form upon taking part in an electron acceptor-donor solid surface chemical reaction, giving it a distinctive color, and a second of said reactants being solid inorganic material in fine particle form providing a large adsorbent surface area and which is an acid relative to the first reactant so as to be an electron acceptor when in adsorption contact with said first reactant, and said reactants being adsorbable one upon the other, the insulating medium being of such texture that application of localized pressure to the record material ruptures said insulating medium at the points of application of such pressure to permit adsorption color-forming reaction contact of the solid reactant particles at such points, whereby a mark of distinctive color is produced by mere application of localized pressure.

2. The record material of claim 1 in which the first one of the color-forming reactants is the compound 3,3 bis (p-dimethylaminophenyl)-6 dimethylamino phthalide, having the structure

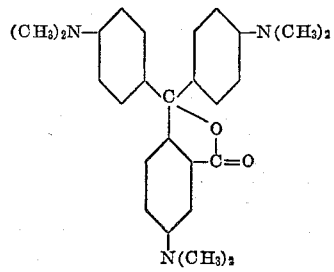

3. The record material of claim 2 in which the second color-forming reactant is kaolin.

4. The record material of claim 3 in which the solid insulating medium is casein.

5. The record material of claim 1 in which the first one of the color-forming reactants is the compound 3,3 bis (p-dimethylaminophenyl)-6 dimethylamino phthalide, having the structure

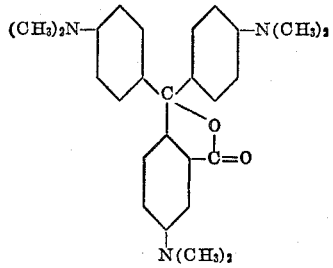

mixed with tetramethylbenzidine, having the structure

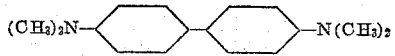

6. The record material of claim 5 in which the second color-forming reactant is kaolin.

7. The record material of claim 1 in which the second one of the color-forming reactants is kaolin.

8. The record material of claim 1 in which the solid insulating medium is casein.

9. Pressure-sensitive record material including the combination of a supporting member; a solid pressure-rupturable medium derived from an organic hydrophilic colloid film-forming material; solid particles of a first color-forming reactant dispersed therein and solid particles of a second color-forming reactant deposited thereon, the said particles of the second reactant being an electron donor aromatic organic compound having a double bond system which is convertible to a more highly polarized conjugated form upon taking part in an electron acceptor-donor solid surface chemical reaction giving it a distinctive color and the first of said color-forming reactants being solid inorganic material in fine particle form providing a large adsorbent surface area and which is an acid relative to the second reactant so as to be an electron acceptor when in adsorption contact with said second reactant, and said reactants being adsorbable one upon the other, said solid insulating medium normally insulating said first and second solid reactant particles from color-forming reaction contact with each other, the application of localized pressure to the record material rupturing said insulating medium at the points of application of such pressure to permit color-forming reaction contact of the solid reactant particles at such points, whereby a mark of distinctive color is produced by mere application of localized pressure.

10. The record material of claim 9 in which the second color-forming reactant is the compound 3,3 bis (p-dimethylaminophenyl) - 6 dimethylamino phthalide, having the structure

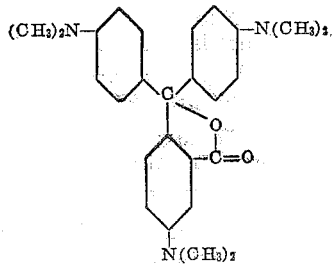

11. The record material of claim 10 in which the first color-forming reactant is kaolin.

12. The record material of claim 11 in which the solid insulating medium is casein.

13. The record material of claim 9 in which the second color-forming reactant is a mixture of the compound 3,3 bis (p-dimethylaminophenyl) - 6 dimethylamino phthalide, having the structure

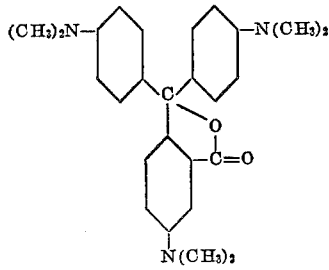

and the compounds tetramethylbenzidine, having the structure

14. The record material of claim 13 in which the first color-forming reactant is kaolin.

15. The record material of claim 14 in which the solid insulating medium is casein.

16. Pressure-sensitive record material including the combination of a supporting member; a rupturable solid insulating medium derived from an organic hydrophilic colloid film-forming material; and solid particles of a plurality of color-forming reactants interpersed in said solid medium and insulated thereby from color-forming reaction contact with each other, a first one of said reactants being solid particles of an electron donor aromatic organic compound having a double bond system which is convertible to a more higher polarized conjugated form upon taking part in an electron acceptor-donor solid surface chemical reaction, giving it a distinctive color, and a second of said reactants being solid inorganic material in fine particle form providing a large adsorbent surface area and which is an acid relative to the first reactant so as to be an electron acceptor when in adsorption contact with said first reactant, and said reactants being adsorbable one upon the other, the application of localized marking pressure to the record material rupturing said insulating medium at the points of application of pressure to permit color-forming reaction contact of the solid reactant particles at such points, whereby a mark of distinctive color is produced by mere application of localized pressure.

17. The record material of claim 16 in which the first one of the color-forming reactants is the compound 3,3 bis (p-dimethylaminophenyl) - 6 dimethylamino phthalide, having the structure

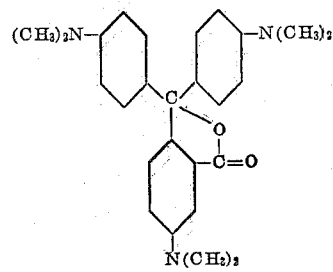

18. The record material of claim 17 in which the second color-forming reactant is kaolin.

19. The record material of claim 18 in which the solid insulating medium is casein.

20. The record material of claim 16 in which the first color-forming reactant includes the compound 3,3 bis (p-dimethylaminophenyl) -6 dimethylamino phthalide, having the structure

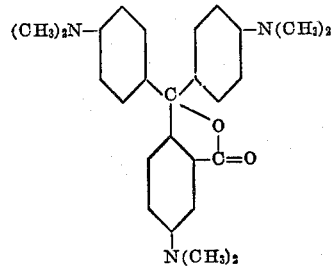

and the compound tetramethylbenzidine, having the structure

21. The record material of claim 20 in which the second of the color-forming reactants is kaolin.

22. The record material of claim 21 in which the solid insulating medium is casein.

23. Pressure-sensitive record material including the combination of a base web and a coating thereon, said coating including solid particles of a plurality of color-forming reactants, so selected as to act in the absence of an ionizing medium to form a distinctive color when brought into contact with each other, and disposed in proximity to each other, and a solid-insulating medium derived from a hydrophilic colloid film-forming material insulating said reactants from color-forming reaction contact with each other, a first one of said reactants being solid particles of an electron donor aromatic organic compound having a double bond system which is convertible to a more highly polarized conjugated form upon taking part in an electron acceptor-donor solid surface chemical reaction, giving it a distinctive color, and a second of said reactants being solid inorganic material in fine particle form providing a large adsorbent surface area and which is an acid relative to the first reactant so as to be an electron acceptor when in adsorption contact with said first reactant, and said reactants being adsorbable one upon the other, the application of localized pressure to the record material rupturing said insulating medium at the points of application of such pressure to permit color-forming reaction contact between the reactants at such points, whereby a mark of distinctive color is produced by mere application of localized pressure.

24. The record material of claim 23 in which the first one of the color-forming reactants is the compound 3,3 bis (p-dimethylaminophenyl)-6 dimethylamino phthalide, having the structure

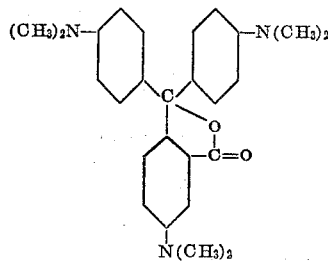

25. The record material of claim 24 in which the second color-forming reactant is kaolin.

26. The record material of claim 25 in which the solid insulating medium is casein.

27. The record material of claim 23 in which the first one of the color-forming reactants is the compound 3,3 bis (p-dimethylaminophenyl)-6 dimethylamino phthalide, having the structure

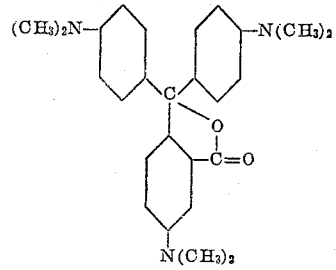

mixed with tetramethylbenzidine, having the structure

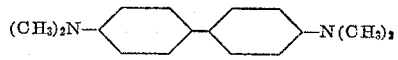

28. The record material of claim 27 in which the second color-forming reactant is kaolin.

BARRETT K. GREEN.

REFERENCES CITED

The following references are of record in the file of this patent:

UNITED STATES PATENTS

| Number | Name | Date |
|--------|------|------|
| 2,083,206 | Schoeller | June 8, 1937 |
| 2,299,693 | Green | Oct. 20, 1942 |

FOREIGN PATENTS

| Number | Country | Date |
|--------|---------|------|
| 550,332 | Great Britain | Jan. 4, 1943 |

OTHER REFERENCES

Hauser et al.: Journal American Chem. Soc., July 1940, vol. 62, pages 1811 to 1814.

Certificate of Correction

Patent No. 2,505,470 April 25, 1950

BARRETT K. GREEN

It is hereby certified that errors appear in the printed specification of the above numbered patent requiring correction as follows:

Column 8, line 1, "sym" should be italicized; column 11, line 3, for "pi-di" read *p-di*; column 13, line 64, for "compounds" read *compound*;

and that the said Letters Patent should be read with these corrections therein that the same may conform to the record of the case in the Patent Office.

Signed and sealed this 8th day of August, A. D. 1950.

[SEAL]

THOMAS F. MURPHY,
*Assistant Commissioner of Patents.*